W. F. MESSITER.
HEATER.
APPLICATION FILED MAY 18, 1918.

1,293,503.

Patented Feb. 4, 1919.
3 SHEETS—SHEET 2.

Witness
J. R. Finney

Inventor
W. F. Messiter
By C. A. Snow & Co.
Attorneys

W. F. MESSITER.
HEATER.
APPLICATION FILED MAY 18, 1918.

1,293,503.

Patented Feb. 4, 1919.
3 SHEETS—SHEET 3.

Witness.

Inventor
W. F. Messiter,
By Ashe & Co.,
Attorneys

UNITED STATES PATENT OFFICE.

WILLIAM F. MESSITER, OF BROOKLYN, NEW YORK.

HEATER.

1,293,503. Specification of Letters Patent. Patented Feb. 4, 1919.

Application filed May 18, 1918. Serial No. 235,297.

*To all whom it may concern:*

Be it known that I, WILLIAM F. MESSITER, a citizen of the United States, residing at Brooklyn, in the county of Kings and State of New York, have invented a new and useful Heater, of which the following is a specification.

The device forming the subject matter of this application is adapted to be employed for raising the temperature of water, and the invention aims to provide an improved heater through which the water passes, novel means being provided for securing a proper circulation of the products of combustion about the heater.

It is within the province of the disclosure to improve generally and to enhance the utility of devices of that type to which the present invention appertains.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings:—

Figure 1:
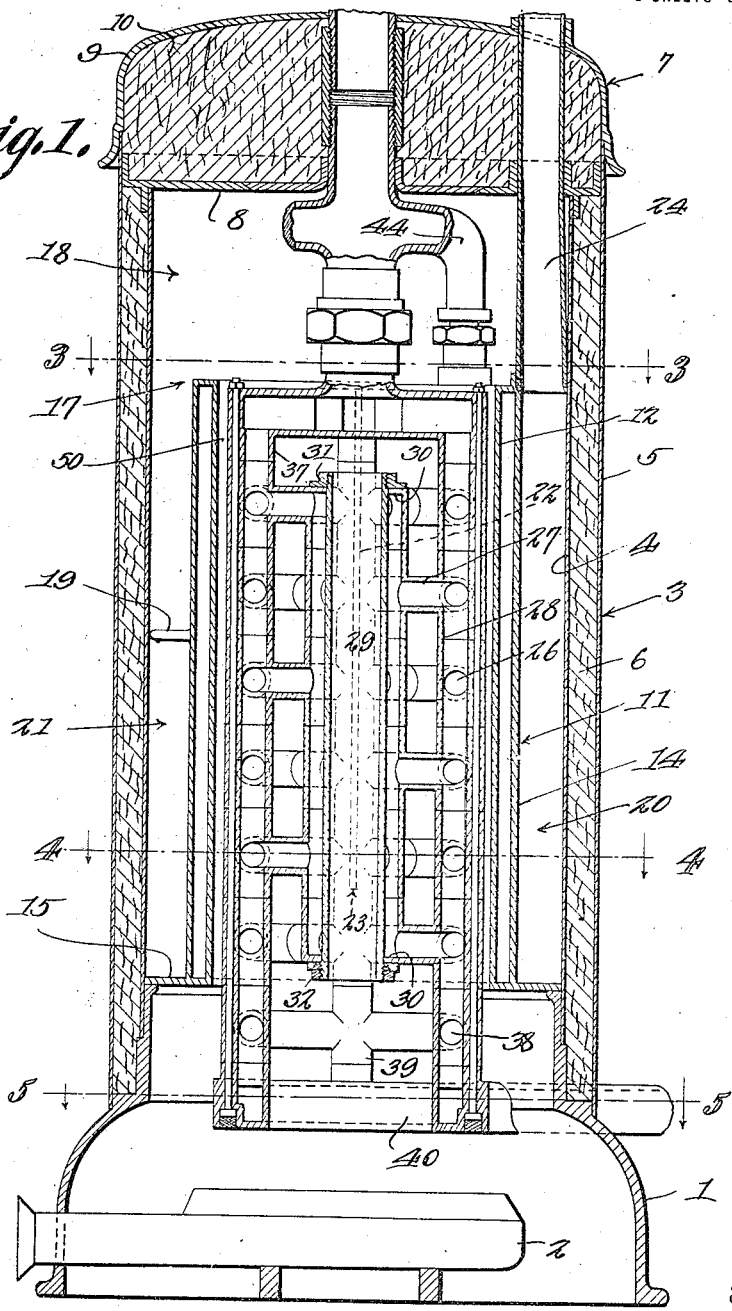
Figure 1 shows in vertical longitudinal section, a device constructed in accordance with the invention, parts appearing in elevation.

The device forming the subject matter of this application includes a hollow base 1 within which is disposed a burner 2 or any other suitable heating means. The invention embodies an upright tubular casing, denoted generally by the numeral 3 and including an inner wall 4, an outer wall 5 and a packing 6 between the walls, the walls of the casing being supported on the base 1. The casing 3, is surmounted by a closure 7, including a top plate 8 mounted on the upper end of the inner wall 4 and extended laterally into contact with the outer wall 5, the closure embodying a cap 9 supported on the outer wall 5, and a packing 10 interposed between the cap and the top plate 8.

Figure 3:
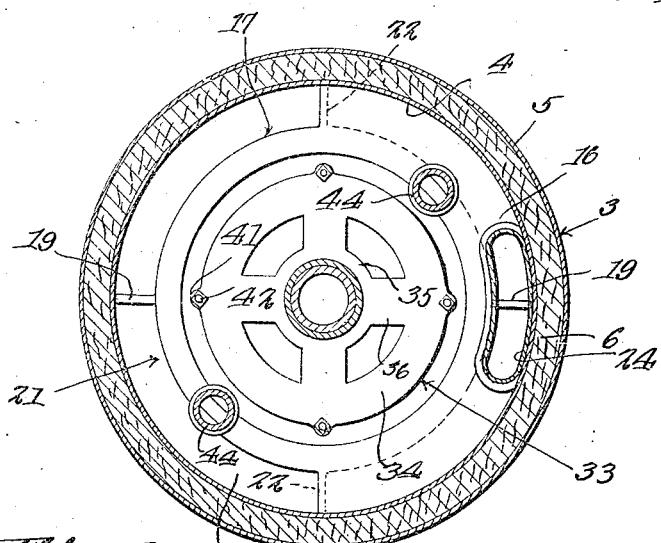
Fig. 3 is a cross section on the line 3—3 of Fig. 1.

Located within the casing 3 is an upright tubular tank 11 closed at its upper and lower ends and including an inner wall 12 and an outer wall 14. An annular lower flange 15 extends laterally from the outer wall 14 of the tank to the inner wall 5 of the casing 3 and is supported on the upper end of the base 1. An upper flange 16 extends laterally from the outer wall 14 of the tank 11 and contacts with the inner wall 5 of the casing 3. As shown in Fig. 3, the flange 16 extends but part way around the tank 11, to form an opening 17 communicating with the chamber 18 which exists in the upper end of the casing 3 above the tank 11. The tank 11 may carry any desired number of spacing lugs 19 coöperating with the inner wall 4 of the casing 3. Oppositely disposed vertical baffles 22 extend downwardly from the ends of the upper flange 16 and terminate, as shown at 23, in spaced relation to the lower flange 15. The baffles 22 form, between the tank 11 and the casing 3, oppositely disposed flues 20 and 21, each of which is of semi-circular cross section. The flue 20 is closed at its upper end by the flange 16 and is closed at its lower end by the flange 15. The lower end of the flue 21 is closed by the flange 15, but the upper end of said flue communicates with the chamber 18 through the opening 17. A stack 24 passes upwardly through the closure 7 and opens at its lower end into the flue 20, through the upper flange 16.

Disposed within the central opening of the tank 11 and spaced from the inner wall 12 of the tank to form an annular flue 50, is a water heater which is a composite structure.

Figure 2:
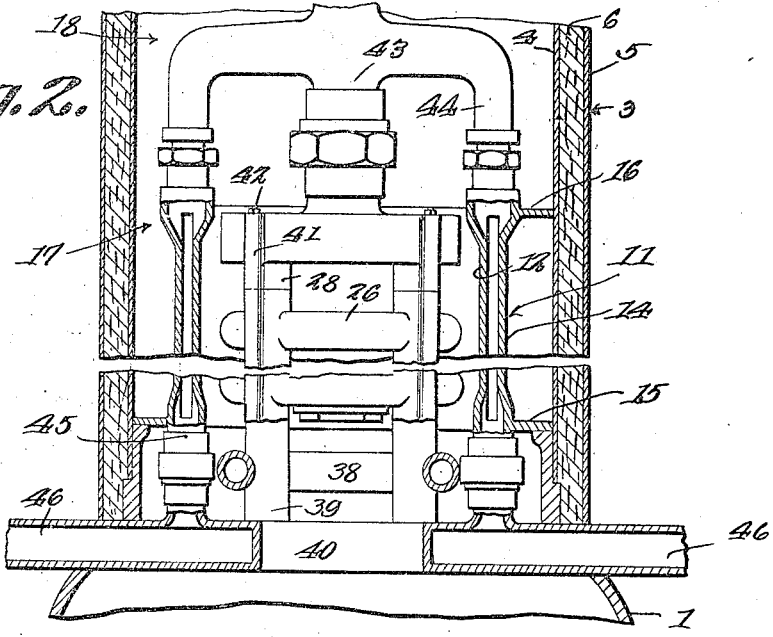
Fig. 2 is a longitudinal section taken in a plane different from the cutting plane in Fig. 1, the central portion of the device being broken away and parts being omitted.

The heater embodies a series of units each comprising a tubular hub 25, an outer tubular ring 26, radial connections 27 between the hub and the ring, and connections 28 projecting upwardly and downwardly from each ring, the connections 28 on one ring coacting with the corresponding connections on the next adjoining ring to form vertical water passages, the hubs 25 of the units abutting to form a central water passage. Extended vertically through the central water passage defined by the hubs 25 is combustion pipe 30. The upper terminal unit has on the upper end of its hub, a flange 30 which extends inwardly into contact with the pipe 29, so as to close the upper end of the space existing between the outer wall of the pipe and the inner walls of the hubs 25. The lower unit of the heater has a similar flange 30 which closes the bottom of the space above alluded to. A collar 31 is threaded on the upper end of the pipe 29 and engages the upper flange 30, there being superposed nuts 32 on the lower end of the pipe which coact with the lower flange 30, the pipe 29, the collars 31 and nuts 32 constituting a part of the means for holding the units of the heater together. Superposed on the uppermost unit of the heater is a top drum 33 including a ring 34, a hub 35, radial connections 36 between the ring and the hub, and depending tubular connections 37 which set against and communicate with the upright connections 28 of the uppermost unit of the heater. The heater includes a unit disposed adjacent the bottom of the heater and comprising a ring 38, an upright connection 39, the unit in question being devoid of a central hub like the part 25. The upper ends of the connections 39 communicate with the connections 28 of the next superposed member of the heater; the lower ends of the connections 39 communicating with a bottom drum 40. The bottom drum 40, the top drum 33 and parts therebetween are supplied with vertical ribs 41, located on the upright tubular connection, as shown in Fig. 2. Securing devices, such as draw bolts 42, pass through the ribs 41 and hold the units of the heater together. In practical operation, the units of the heater are made separately; their meeting edges may be brazed together, and the draw bolts 42 hold the units together, and prevent their separation.

A main outlet pipe 43 passes through the closure 7 and communicates with the hub 35 of the top drum 33. The part 43 is supplied with lateral depending branches 44 opening into the tank 11 at diametrically opposite points, and at the top of the tank. By means of connections 45 shown in Fig. 2, the lower end of the tank 11 communicates with the drum 40. The drum 40 is supplied with oppositely disposed inlet pipes 46, one of which may be closed if desired.

Figure 4:
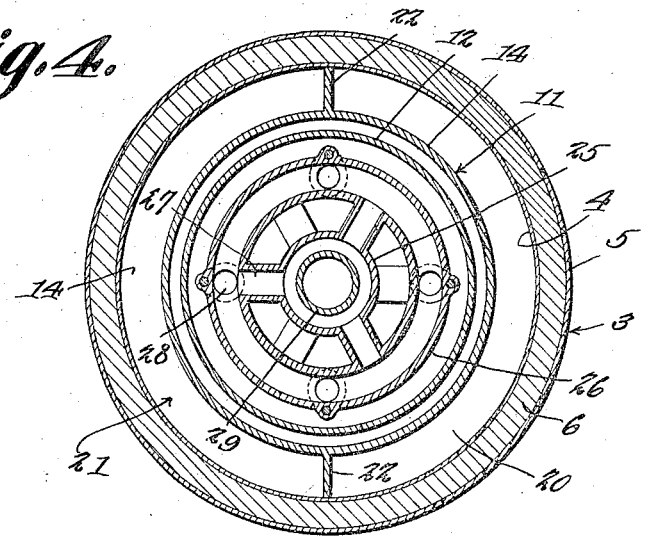
Fig. 4 is a cross section on the line 4—4 of Fig. 1.
Figure 5:
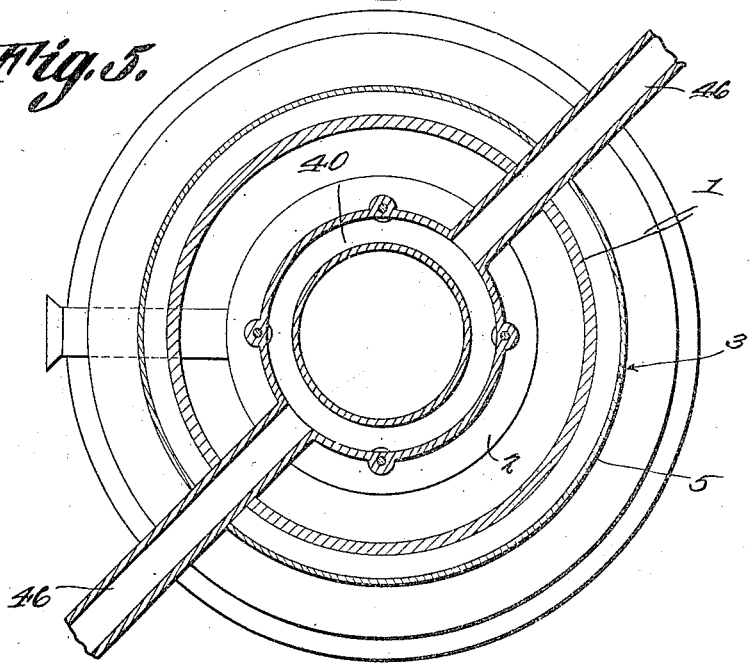
Fig. 5 is a cross section on the line 5—5 of Fig. 1.

In practical operation, the products of combustion from the burner 2 pass upwardly through the flue 50, between the tank 11 and the heater, and enter the chamber 18. Similarly, the products of combustion from the burner 2 pass upwardly through the bottom drum 40, and the next superposed unit of the heater; the products of combustion traversing the combustion pipe 29 so as to heat the water in the hubs 25. The products of combustion pass upwardly around the radial connections 27, and since the connections are disposed out of alinement, as shown in Fig. 4, the water in the connections will be heated. The products are first delivered into the chamber 18 but cannot pass directly out of the stack 24, because the stack communicates with the flue 20, but not with the chamber. Consequently, the products of combustion pass downwardly through the opening 17, along the flue 21, through the openings 23 at the lower ends of the baffles 22, upwardly through the flue 20 and out of the stack 24.

The water delivered into the drum 40 through one of the pipes 46 traverses the rings 26, the hubs 25 and the radial connections 27, and is heated to a high degree. When the heated water is delivered into the top drum 33, water passes into the main outlet pipe 43 and thence to the place of use. If a sufficient quantity of water is not permitted to flow through the pipe 43, then the water will travel downwardly through the branches 44, into the tank 11, and out of the tank through the connections 45 into the lower drum 40, an equalizing circuit thus being maintained.

Having thus described the invention, what is claimed is:—

1. In a device of the class described, a water heater comprising upper and lower terminal main members including outer rings, hubs, connections between the rings and the hubs, and upright connections between the rings; an open ended combustion pipe passing through the hubs and spaced therefrom, the hubs of the terminal members having inwardly extended flanges coöperating with the pipe to close the space between the hubs and the pipe; means for securing the ends of the pipe to the flanges; a tank surrounding the heater and spaced therefrom to form a flue; a water outlet for the top of the heater and embodying a branch communicating with the top of the tank; a water supply; means for establishing a communication between the water supply and the bottom of the heater; means for establishing a communication between the tank and the bottom of the heater; a burner discharging into the pipe and into the flue; and means for conducting the products of combustion downwardly from the upper ends of the pipe and the flue about a part of the circumference of the tank, and upwardly around the remaining portion of the circumference of the tank.

2. In a device of the class described, a water heater comprising upper and lower terminal members including outer rings, hubs, connections between the rings and the hubs, and upright connections between the rings; an open ended combustion pipe passing through the hubs and spaced therefrom, the hubs of the terminal members having inwardly extended flanges coöperating with the pipe to close the space between the hubs and the pipe; clamping devices on the ends of the pipe and engaging the flanges to hold said members together; a tank surrounding the heater and spaced therefrom to form a flue; a water outlet for the top of the heater and including a branch communicating with the top of the tank; a water supply; means for establishing communication between the water supply and the bottom of the heater; means for establishing communication between the tank and the bottom of the heater; a burner discharging into the pipe and into the flue; and means for conducting the products of combustion downwardly from the upper ends of the pipe and the flue about a part of the circumference of the tank and upwardly around the remaining portion of the circumference of the tank.

3. In a device of the class described, a water heater comprising upper and lower terminal members including outer rings, hubs, connections between the rings and the hubs, and upright connections between the rings; an open ended combustion pipe passing through the hubs and spaced therefrom, the hubs of the terminal members having inwardly extended flanges coöperating with the pipe to close the space between the hubs and the pipe; draw bolts connecting the members of the heater; a tank surrounding the heater and spaced therefrom to form a flue; a water outlet for the top of the heater and communicating with the top of the tank; a water supply; means for establishing communication between the water supply and the bottom of the heater; means for establishing communication between the bottom of the tank and the heater; a burner discharging into the pipe and the flue; and means for conducting the products of combustion downwardly from the upper ends of the pipe and the flue about a part of the circumference of the tank and upwardly around the remaining portion of the circumference of the tank.

4. In a device of the class described, an outer casing having a chamber at its top; a double walled tank in the casing and provided at its lower end with an outstanding annular flange engaged with the casing, the tank being supplied at its top with an outwardly extended upper flange engaged with the casing and having an opening, the tank being spaced from the casing to form two flues, one of which is closed at its upper and lower ends by the flanges, the other of which communicates at its upper end with the chamber by way of the opening and is closed at its lower end by the annular flange, there being baffles extended downwardly from the upper flange, to separate the flues, and there being openings at the lower ends of the baffles, for establishing communication between the flues; a stack leading from the first specified flue; a water heater within the tank and spaced therefrom to define a flue open at its lower end and communicating at its upper end with the chamber, the heater comprising hubs, outer rings, connections between the hubs and the rings, upright connections between the rings, and an open ended combustion pipe passing through the hubs; an outlet conduit leading from the top of the heater and having a branch communicating with the top of the tank; means for establishing communication between the lower end of the tank and the lower end of the heater; means for supplying water to the heater; and a burner disposed below the heater.

In testimony that I claim the foregoing as my own, I have hereunto affixed my signature in the presence of two witnesses.

WILLIAM F. MESSITER.

Witnesses:
JOHN J. BARRY,
JOHN McINTYRE.

Copies of this patent may be obtained for five cents each, by addressing the "Commissioner of Patents, Washington, D. C."